(12) United States Patent
Nakata et al.

(10) Patent No.: US 8,955,817 B2
(45) Date of Patent: Feb. 17, 2015

(54) BASE ANCHORING STRUCTURE

(75) Inventors: Yusuke Nakata, Chofu (JP); Masao Doi, Fuchu (JP); Tatsuya Hashimoto, Mitaka (JP)

(73) Assignee: Mitaka Kohki Co., Ltd., Tokyo (JP)

( * ) Notice: Subject to any disclaimer, the term of this patent is extended or adjusted under 35 U.S.C. 154(b) by 251 days.

(21) Appl. No.: 12/944,888

(22) Filed: Nov. 12, 2010

(65) Prior Publication Data

US 2011/0114817 A1  May 19, 2011

(30) Foreign Application Priority Data

Nov. 17, 2009  (JP) ............................... P2009-261860

(51) Int. Cl.

| | | |
|---|---|---|
| F16M 1/00 | (2006.01) | |
| F16M 3/00 | (2006.01) | |
| F16M 5/00 | (2006.01) | |
| F16M 7/00 | (2006.01) | |
| F16M 9/00 | (2006.01) | |
| F16M 11/00 | (2006.01) | |
| B23Q 1/00 | (2006.01) | |
| G02B 7/00 | (2006.01) | |
| G02B 21/00 | (2006.01) | |
| F16M 13/00 | (2006.01) | |
| A47B 97/00 | (2006.01) | |
| A47B 91/00 | (2006.01) | |
| B60B 33/00 | (2006.01) | |

(52) U.S. Cl.
CPC ............... F16M 7/00 (2013.01); B23Q 1/0054 (2013.01); G02B 7/001 (2013.01); G02B 21/0012 (2013.01)
USPC ........... 248/680; 248/500; 248/503; 248/636; 248/654; 188/1.12; 16/44

(58) Field of Classification Search
CPC .. B23Q 1/0054; G02B 21/0012; G02B 7/001; F16M 7/00
USPC .............. 248/415, 500–503, 503.1, 507, 509, 248/510, 680, 681, 188.1–188.5, 188.8, 248/297.51; 60/589, 533, 585; 91/196, 217, 91/368; 92/118, 248; 16/49, 51, 52, 57, 16/58, 82–86 B
IPC ....................... B60B 33/06, 33/00; A61B 19/00
See application file for complete search history.

(56) References Cited

U.S. PATENT DOCUMENTS 1,749,751 A * 3/1930 Bergsten ............................ 16/44
2,176,255 A * 10/1939 Frost .......................... 248/188.3

(Continued)

FOREIGN PATENT DOCUMENTS

JP        10-16505        1/1998

*Primary Examiner* — Jonathan Liu
*Assistant Examiner* — Muhammad Ijaz
(74) *Attorney, Agent, or Firm* — Greenblum & Bernstein, P.L.C.

(57) ABSTRACT

A base anchoring structure fixes a base 3 of an apparatus body 2 to a floor F in position. The base is at a lower part of the apparatus body and has casters C to move the apparatus body along the floor. The base anchoring structure includes linear actuators 4 fixed to the base, to downwardly bias, with a uniform pressure provided by air A supplied to the linear actuators, their respective pistons 5 until lower ends of the pistons reach the floor and stopper units (7, 8, 10) to engage with the downwardly pushed pistons and stably maintain the downwardly pushed state of the pistons. The engagement of the stopper units with the pistons stably maintains the anchored state of the base. The plurality of actuator is easily operated only by supplying air thereto.

5 Claims, 7 Drawing Sheets

(56) References Cited

U.S. PATENT DOCUMENTS

| | | | | |
|---|---|---|---|---|
| 2,262,288 A | * | 11/1941 | Klipstein et al. | 188/152 |
| 4,490,979 A | * | 1/1985 | Reynolds | 60/581 |
| 5,251,858 A | * | 10/1993 | Ultee | 248/188.3 |
| 5,713,545 A | * | 2/1998 | Nakamura | 248/123.2 |
| 5,774,936 A | * | 7/1998 | Vetter | 16/35 R |
| 5,860,446 A | * | 1/1999 | Hunt | 137/464 |
| 6,772,742 B2 | * | 8/2004 | Lei et al. | 123/568.14 |
| 8,087,126 B2 | * | 1/2012 | Duvert et al. | 16/33 |
| 8,302,743 B2 | * | 11/2012 | Pike et al. | 188/151 R |
| 2006/0248977 A1 | * | 11/2006 | Umetsu et al. | 74/490.07 |
| 2008/0190696 A1 | * | 8/2008 | Pike et al. | 182/202 |
| 2008/0308704 A1 | * | 12/2008 | Kostin | 248/503.1 |
| 2010/0037426 A1 | * | 2/2010 | Mongelluzzo et al. | 16/32 |

* cited by examiner

BASE ANCHORING STRUCTURE

BACKGROUND OF THE INVENTION

1. Field of the Invention

The present invention relates to a base anchoring structure for fixing a base of an apparatus body to a floor in position.

2. Description of the Related Art

A base is arranged at a lower part of an apparatus body, to support the apparatus body in an upright position and move/anchor the apparatus body with respect to a floor. To move and anchor the apparatus body, the base has a moving device such as a caster as well as an anchoring device such as a stopper. The base also has a lifting device that selectively lowers and lifts the moving and anchoring devices, to establish a movable or anchored state of the apparatus body. An example of the anchoring device is disclosed in Japanese Unexamined Patent Application Publication No. H10-16505. This related art lowers a plurality of legs in an integrated fashion to a floor.

SUMMARY OF THE INVENTION

According to the related art, the plurality of leg is lowered in an integrated manner to a floor, and therefore, the legs will be imbalanced on the floor if the floor has irregularities. Namely, due to the irregularities of the floor, some of the legs will be in contact with the floor and the others will be spaced therefrom, to destabilize the apparatus body.

In consideration of the problem of the related art, the present invention provides a base anchoring structure capable of fixing a plurality of locations of a base of an apparatus body relative to a floor with a uniform contact pressure.

According to an aspect of the present invention, the base anchoring structure fixes a base of an apparatus body relative to a floor, the base being at a lower part of the apparatus body and having a plurality of moving units to move the apparatus body along the floor. The base anchoring structure includes linear actuators fixed to a plurality of locations on the base and configured to downwardly bias, with a uniform pressure provided by working fluid supplied to the linear actuators, their respective pistons until lower ends of the pistons reach the floor and stopper units configured to engage with the downwardly biased pistons, respectively, and maintain the downwardly biased state of the pistons.

According to another aspect of the present invention, each of the stopper units includes a stopper plate having an engagement hole to pass the piston, a hinge fixed relative to the base and configured to support a first end of the stopper plate, and a spring configured to upwardly bias the stopper plate away from the base. An edge of the engagement hole engages with a side face of the piston. The engagement of the engagement hole with the side face of the piston is released when downward external force is applied to a second end of the stopper plate.

DESCRIPTION OF THE PREFERRED EMBODIMENT

An embodiment of invention will be explained with reference to the drawings.

Figure 1:
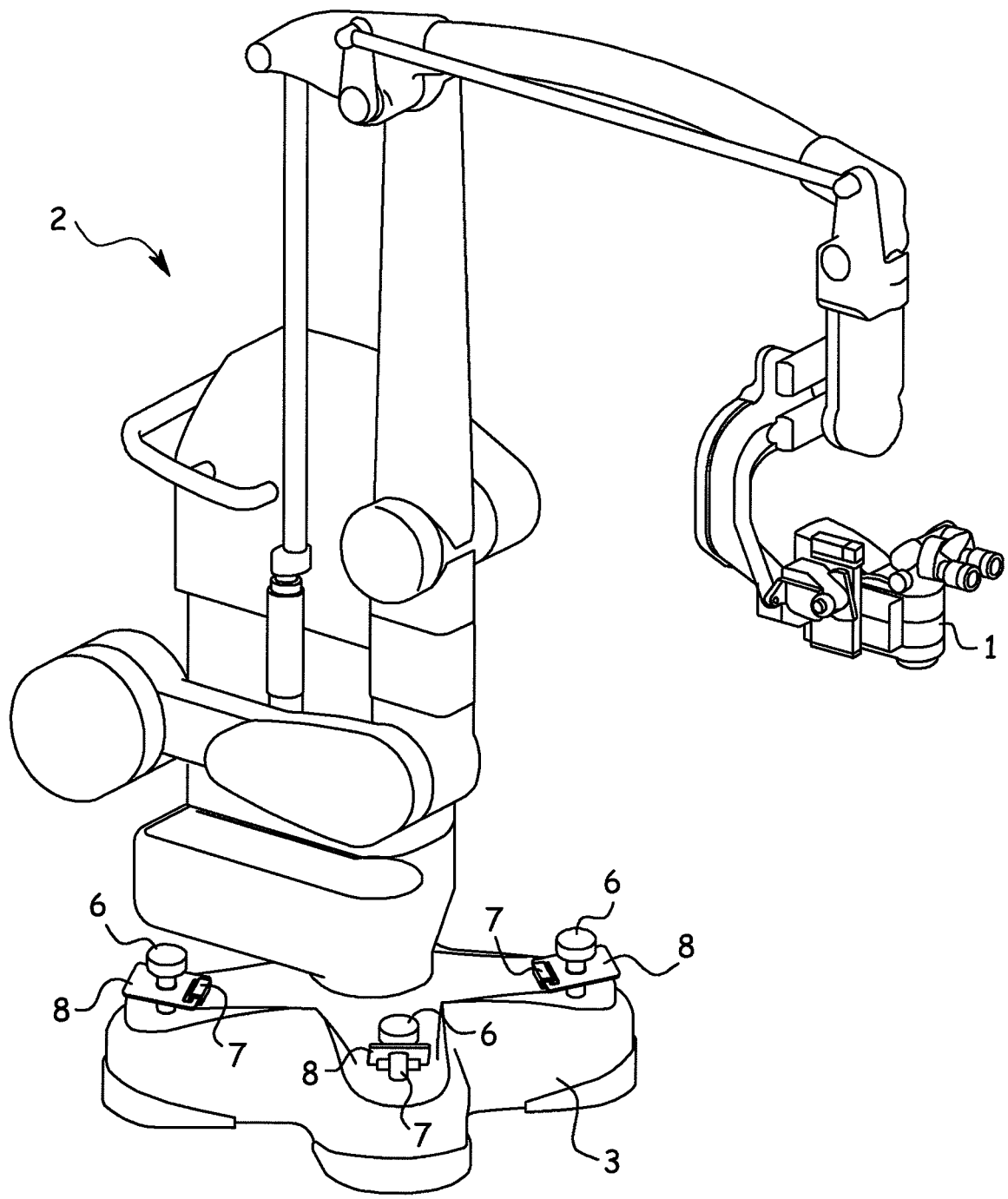
FIG. 1 is a perspective view illustrating a stand apparatus whose base is provided with a base anchoring structure according to an embodiment.
Figure 2:
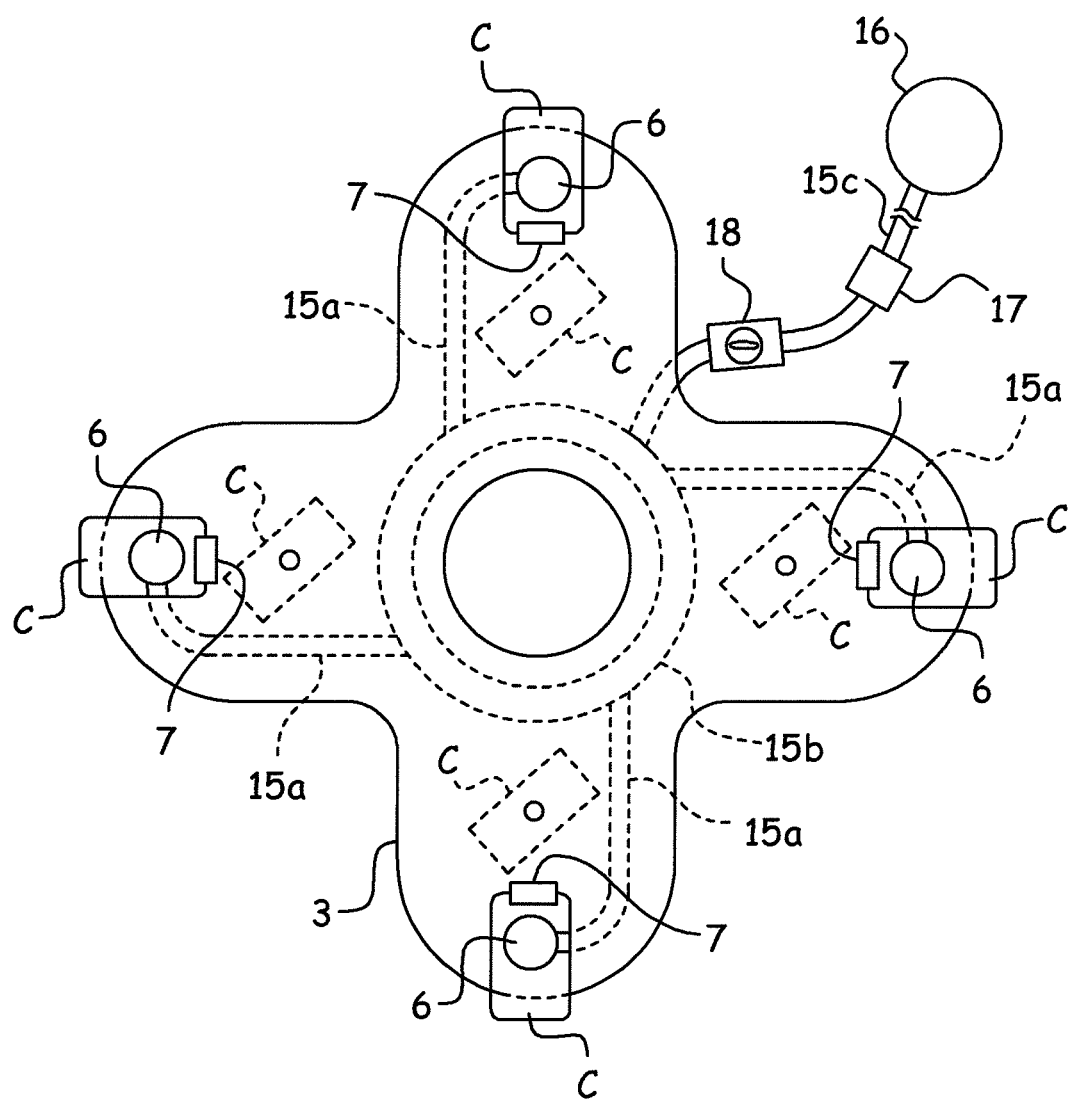
FIG. 2 is a plan view illustrating the base of the stand apparatus.
Figure 3:
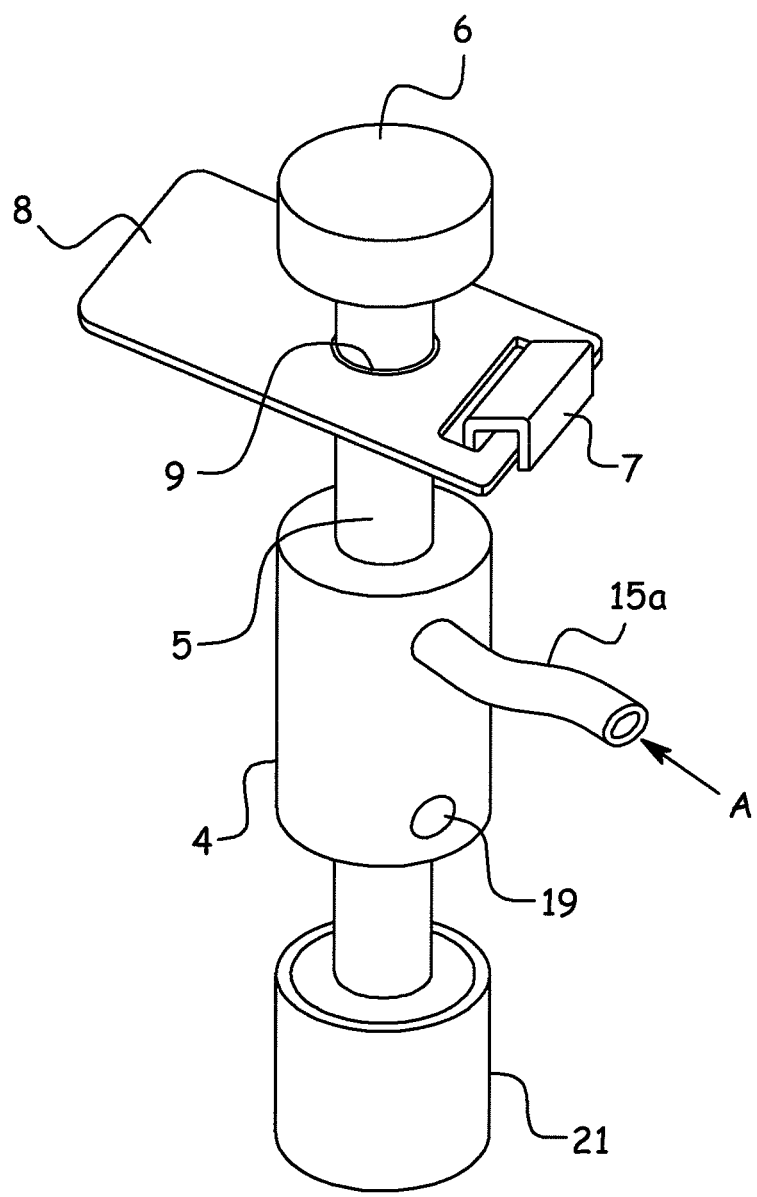
FIG. 3 is a perspective view illustrating an actuator of the base anchoring structure.

FIG. 1 illustrates a medical stand apparatus 2 supporting a surgical microscope 1. The stand apparatus 2 corresponds to the "apparatus body" stipulated in the claims. At a lower part of the stand apparatus 2, there is a base 3 provided with a base anchoring structure according to an embodiment. The base 3 substantially has a cross shape and is hollow with the bottom thereof opened.

The base 3 has four casters C at four locations. The casters C correspond to the "moving units" stipulated in the claims. The casters C roll on a floor F, to move and turn the stand apparatus 2 on the floor F.

Each of four corners of the base 3 is provided with a linear actuator 4. The linear actuators 4 are parts of the base anchoring structure according to the present embodiment. Each actuator 4 has a vertical cylinder that accommodates a piston 5. The piston 5 vertically passes through the cylinder. An upper end 6 of the piston 5 upwardly protrudes from a top face of the base 3.

On the top face of the base 3, a stopper plate 8 is arranged around each piston 5. A first end of the stopper plate 8 is supported with a hinge 7 so that the stopper plate 8 is turnable about the hinge 7. Between a second end of the stopper plate 8 and the top face of the base 3, a spring 10 as a biasing unit is arranged to upwardly bias the stopper plate 8. The hinge 7, stopper plate 8, and spring 10 form the "stopper unit" stipulated in the claims.

The stopper plate 8 has an engagement hole 9 having a diameter D that is slightly larger than a diameter d of the piston 5. The piston 5 extends through the engagement hole 9.

Each of upper and lower ends of the cylinder of the actuator 4 has a sealing O-ring 11 around the piston 5. The piston 5 in the cylinder of the actuator 4 has a flange 12 surrounded with an O-ring 11. A space above the flange 12 in the cylinder of the actuator 4 defines an air chamber 13. Under the flange 12 in the cylinder of the actuator 4, a spring 14 is arranged.

The air chamber 13 is connected to a distribution hose 15a. The four distribution hoses 15a of the four actuators 4 of the base anchoring structure are connected to an annular common hose 15b, which is connected to a supply hose 15c. The supply hose 15c receives compressed air A from a pump 16 through a regulator 17 and a valve unit 18. The regulator 17 adjusts the pressure of the air A. The valve unit 18 is manually turned to feed and stop the air A to the actuators 4.

The common hose 15b, which is on the downstream side of the valve unit 18, communicates with the distribution hoses 15a whose internal pressure is adjusted by the regulator 17 to a predetermined pressure. The valve unit 18 is of a 3-port residual pressure releasing type. The valve unit 18 is manually turned to feed the air A of the predetermined pressure to the common hose 15b and is further turned to release residual pressure of the air A from the common hose 15b and distribution hoses 15a.

Each actuator 4 has an air hole 19 below the flange 12 of the piston 5. Through the air hole 19, air stayed in a space under the flange 12 freely moves between the inside and outside the cylinder of the actuator 4, so that the piston 5 may smoothly move in upward and downward directions.

A lower end of the piston 5 is provided with a damper structure 21 as an elastic body. The damper structure 21 resiliently expands and contracts due to a spring 20.

Figure 5:
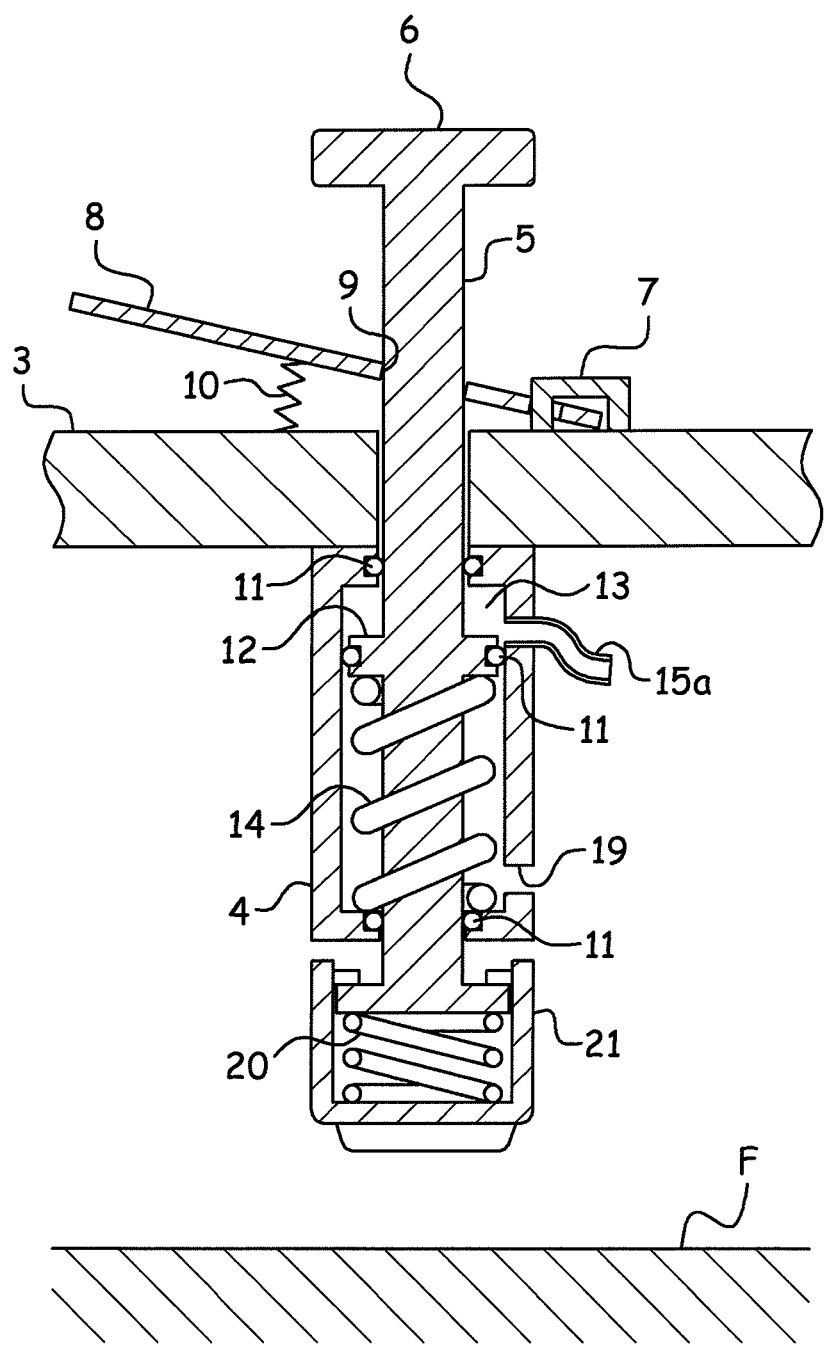
FIG. 5 is a sectional view illustrating the actuator in a unanchored state.

Operation of the base anchoring structure according to the present embodiment will be explained. In an initial state illustrated in FIG. 5, the piston 5 is at a lifted position due to the biasing force of the spring 14. In this state, the base 3 can freely move on the floor F with the casters C.

Fixing of the base 3 to the floor F in position with the base anchoring structure will be explained.

Figure 6:
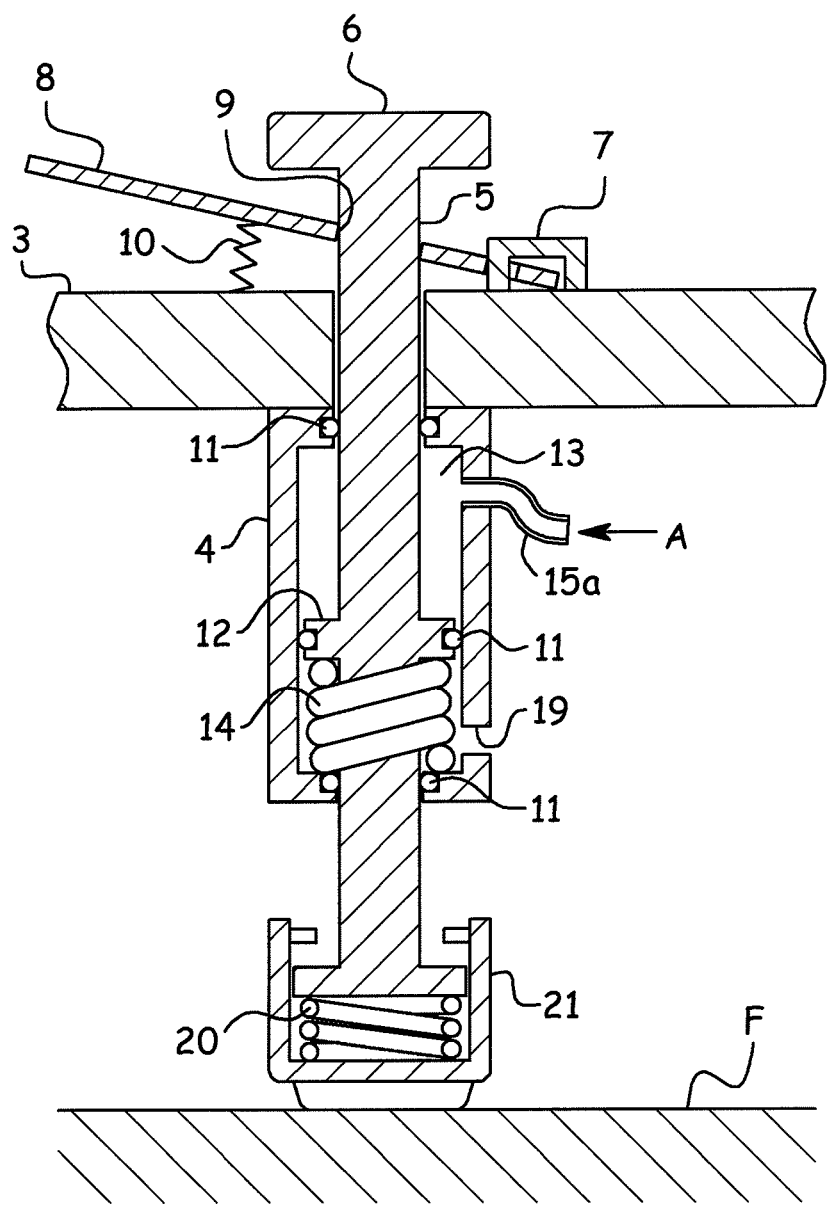
FIG. 6 is a sectional view illustrating the actuator in a anchored state.

When the base 3 is moved to a required position, the valve unit 18 is turned to supply air A from the pump 16 into the actuators 4 through the common hose 15b and distribution hoses 15a. At this time, the air A is commonly supplied to the four distribution hoses 15a, and therefore, the distribution hoses 15a have a uniform air pressure. The air A supplied into the air chambers 13 of the actuators 4 lower the pistons 5 so that each piston 5 downwardly protrudes as illustrated in FIG. 6.

The damper structure 21 at the lower end of each piston 5 is pressed to the floor F, and instead of the casters C, the actuators 4 support the weight of the stand apparatus 2. In this state, the spring 20 in each cushion structure 21 is not completely compressed by the pressure of the air A. Namely, the resiliency of the spring 20 is so set that the spring 20 can resiliently expand and contract under the full pressure of the air A. Even when the actuators 4 partly bear the weight of the stand apparatus 2, the base anchoring structure with the actuators 4 can stably anchor the base 3 to the floor F.

The air A is commonly supplied to the actuators 4 to establish a uniform pressure through the actuators 4. The cylinders of the actuators 4 have the same sectional area. The cushion structures 21, therefore, apply the same downward force to the floor F and produce the same static friction with respect to the floor F.

Under the uniform pressure from the air A, the four pistons 5 individually descend and the damper structures 21 at the lower ends of the pistons 5 come in contact with the floor F. Accordingly, irregularities of the floor F cause no problems. When reaching the floor F, the damper structures 21 generate static friction to prevent the casters C from rotating and anchor the base 3 to the floor F. The four actuators 4 are operated with the single valve unit 18, and therefore, the base anchoring structure according to the present embodiment is easy to manipulate.

Fixing the pistons 5 with the stopper units will be explained. When each piston 5 is lowered, an upper part of the piston 5 protruding upward from the corresponding actuator 4 engages with the engagement hole 9 of the stopper plate 8, thereby maintaining the lowered state of the piston 5. When the pistons 5 complete the anchoring of the base 3 to the floor F, the valve unit 18 is further turned to release residual pressure of the air A from the actuators 4. Even after the residual pressure is released, the damper structures 21 at the lower ends of the pistons 5 keep the contact state with the floor F because of the engagement of each piston 5 with the engagement hole 9 of the corresponding stopper plate 8.

Figure 4:
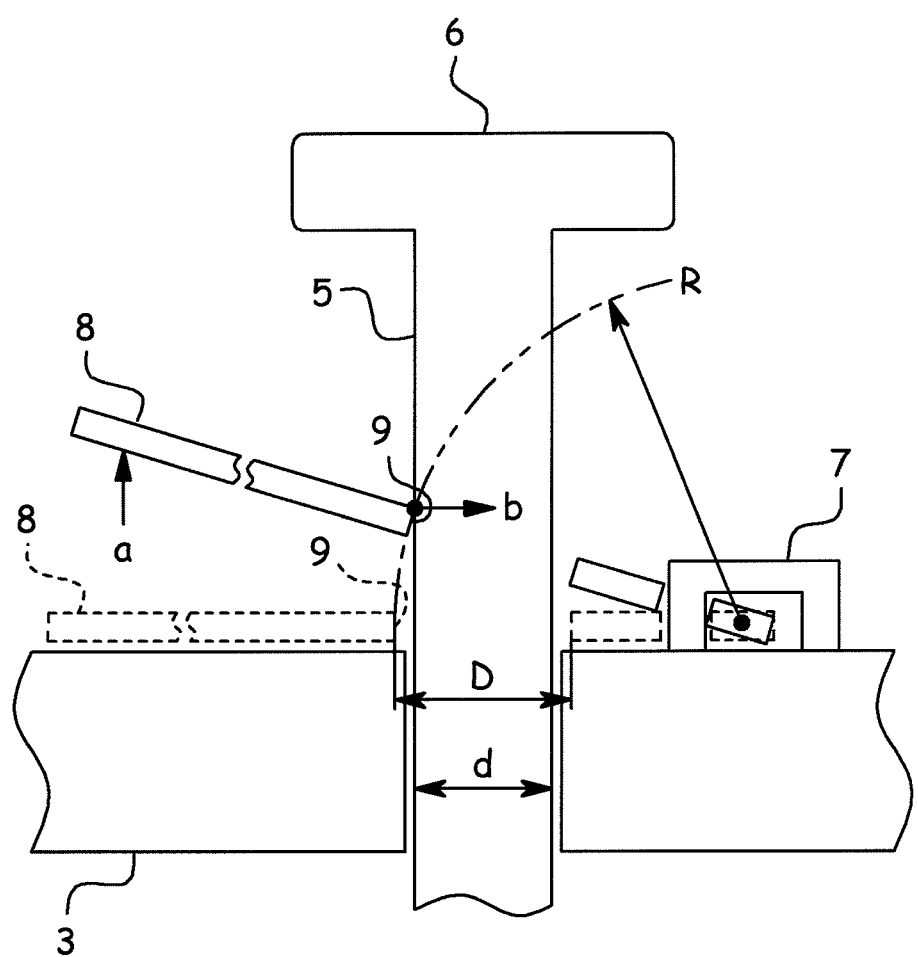
FIG. 4 is a sectional view illustrating a stopper unit of the base anchoring structure.

As illustrated in FIG. 4, the spring 10 applies upward force depicted by a to the stopper plate 8. Accordingly, the engagement hole 9 of the stopper plate 8 moves clockwise along a circular arc depicted by R around the hinge 7. When the stopper plate 8 is at a lowered position where the stopper plate 8 is in parallel with the top face of the base 3, the engagement hole 9 is disengaged from the piston 5 because the diameter D of the engagement hole 9 is larger than the diameter d of the piston 5. As the stopper plate 8 is raised, an inner edge part of the engagement hole 9 distal from the hinge 7 moves along the circular arc R. As a result, the inner edge part of the engagement hole 9 is pressed to the piston 5 with an engagement force b proportional to the force a of the spring 10, thereby maintaining the downwardly protruding state of the piston 5.

Under this state, if any piston 5 receives reaction from the floor F and moves upward, the upward movement of the piston 5 interferes with the movement of the inner edge part of the engagement hole 9 along the circular arc R. Then, the inner edge part of the engagement hole 9 bites the side face of the piston 5, to increase the engagement force b and thereby maintain the downwardly protruding state of the piston 5.

After the base 3 is fixed to the floor F in position with the base anchoring structure according to the present embodiment, there is a possibility that the base 3 receives external horizontal force to slide along the floor F. If this happens, conditions of the floor F relative to the base anchoring structure of the base 3 will change. In this case, the damper structures 21 arranged at the lower ends of the pistons 5 resiliently expand and contract according to the conditions of the floor F, thereby stabilizing the anchored state of the base 3 to the floor F.

Releasing the stopper units of the base anchoring structure will be explained.

Figure 7:
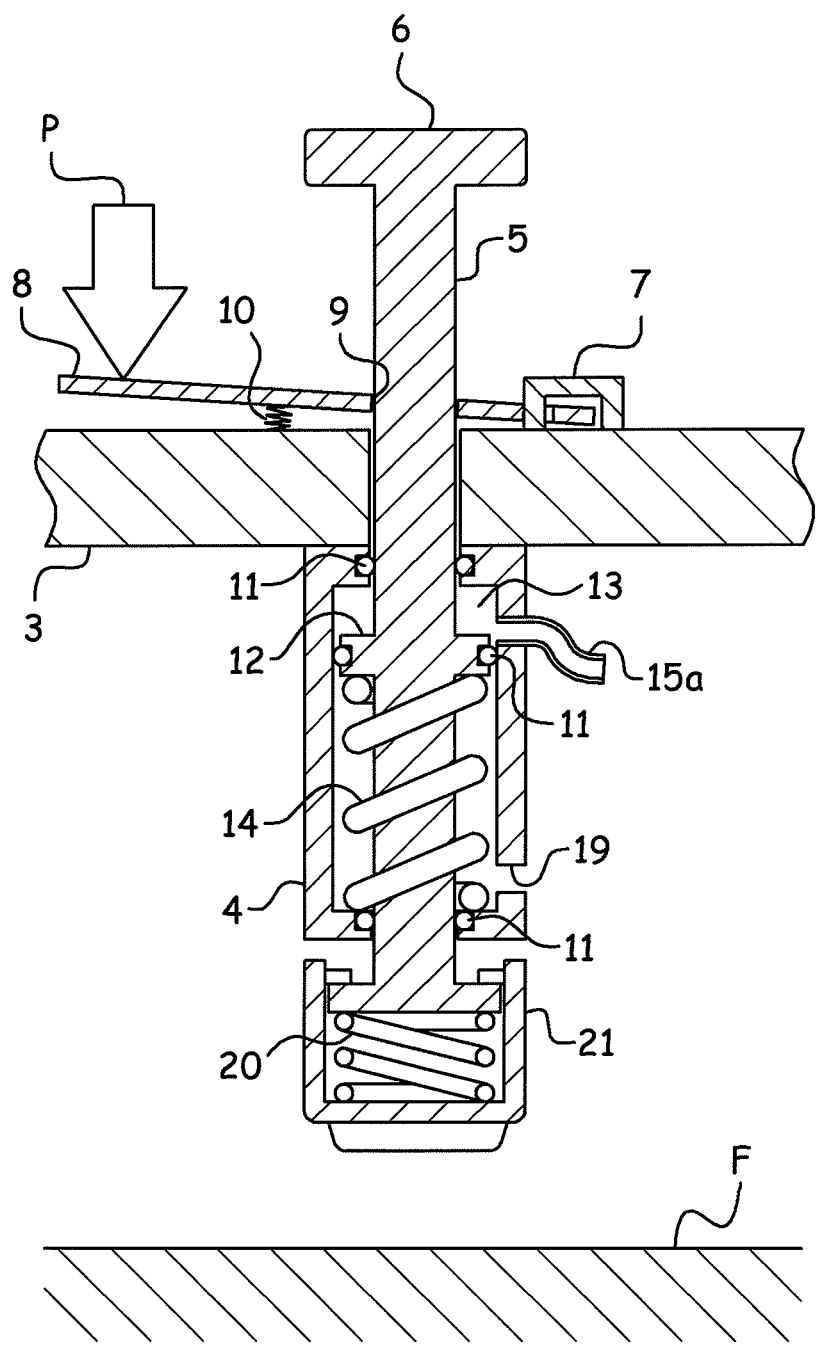
FIG. 7 is a sectional view illustrating the actuator in a piston releasing state.

To release the anchored state of the base 3, each stopper plate 8 is stepped with one's foot to apply an external force P downwardly to the second end of the stopper plate 8 as illustrated in FIG. 7. The stopper plate 8 turns counterclockwise (downward) to release the engagement hole 9 from the piston 5. There is no residual pressure in each actuator 4, and therefore, the piston 5 rises due to the resiliency of the spring 14. As a result, the stand apparatus 2 with the base 3 becomes movable with the casters C.

Manual fixing of the base anchoring structure will be explained.

According to the present embodiment, the pressure of the air A is normally used to push the pistons 5 downward. If the pump 16 malfunctions so that no air is supplied to the actuators 4, the upper end 6 of each piston 5 is stepped with one's foot, to downwardly protrude the piston 5 and fix the base 3 to the floor F in position.

Although the above-mentioned embodiment employs air as working fluid for the actuators 4, the actuators 4 may be modified to use liquid such as oil as the working fluid. Although the present embodiment employs four actuators 4 in consideration of the shape of the base 3, any number of actuators 4 are employable.

The base anchoring structure according to the present invention supplies working fluid to the actuators 4 to establish a uniform pressure in the actuators 4 and downwardly push the pistons 5 to the floor F with the uniform pressure. Even if the floor F involves irregularities, the pistons 5 individually come in contact with the floor F under the same pressure. The pistons 5 get in contact with the floor F under the same pressure and generate static friction relative to the floor F, to establish a stable anchored state. The downwardly protruding state of each piston 5 is maintained with the stopper unit even after the pressure of the working fluid is released, to continuously maintain the stable anchored state. The plurality of actuators 4 are easily operated only by supplying the working fluid to the actuators 4.

When applied external force, each stopper unit releases the piston 5. The actuators 4 keep no residual pressure because of the function of the valve unit 18, and therefore, each piston 5 receives upward force only from the spring 14. Accordingly, when released from the stopper unit, the piston 5 upwardly moves to release the anchored state of the base 3. Only by applying external force to a part of each stopper unit, the anchored state of the base 3 is released. In this way, the base anchoring structure according to the embodiment is easy to operate.

The upper end of each piston 5 upwardly protrudes from the top face of the base 3, and therefore, each piston 5 can manually be operated by, for example, pushing down the same with one's foot, instead of using the pressure of working fluid. Even if the working fluid supplying mechanism malfunctions or even if power supply fails, the base anchoring structure according to the present invention can manually be operated to fix in position and release the base 3.

The lower end of each piston 5 is provided with the damper structure 21 that resiliently expands and contracts. Even if the pistons 5 that are in the pushed-down state and are engaging with the stopper units receive external force to slid along the floor F, the damper structures 21 deal with irregularities of the floor F, to stably anchor the base 3 to the floor F.

This application claims benefit of priority under 35 USC §119 to Japanese Patent Application No. 2009-261860, filed on Nov. 17, 2009, the entire contents of which are incorporated by reference herein. Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A base anchoring structure for fixing a base of an apparatus body to a floor in a position, the base being at a lower part of the apparatus body and having a plurality of moving units to move the apparatus body along the floor, the base anchoring structure comprising:
 a plurality of linear actuators fixed relative to a plurality of locations on the base and configured to each downwardly bias a piston having a flange,
 each linear actuator having a vertical cylinder that accommodates the piston and the flange and a space, and configured as an upper chamber and a lower chamber,
 the upper chamber is provided above the flange in the vertical cylinder and provided with an upper hole,
 the lower chamber accommodating a bias spring is provided below the flange in the vertical cylinder and provided with a lower hole on a wall of the vertical cylinder such that air stayed in a lower space under the flange freely moves between inside and outside the cylinder through the lower hole, and when no pressure is present in each actuator, the piston is movable upward in the vertical cylinder due to a resilience of the bias spring;
 a plurality of pistons having lower ends, each lower end of the plurality of pistons being individually descendible toward the floor to a downwardly biased state when a uniform pressure provided by a working fluid is supplied to the chamber of each linear actuator through the upper hole; and
 a plurality of stopper units fixed relative to the base and configured to engage with the downwardly biased plurality of pistons, respectively, and to maintain the downwardly biased state of the plurality of pistons, wherein each of the plurality of stopper units includes:
  a stopper plate having an engagement hole for passing the piston therethrough;
  a hinge fixed relative to the base and configured to support a first end of the stopper plate; and
  a spring configured to upwardly bias the stopper plate away from the base, wherein
  an edge of the engagement hole engages a side face of the piston, and
  the engagement of the engagement hole with the side face of the piston is releasable when downward external force is applied to a second end of the stopper plate.

2. The base anchoring structure of claim 1, further comprising:
 a valve unit of residual pressure releasing type configured to supply air serving as the working fluid to the plurality of linear actuators; and
 a biasing unit provided for each of the plurality of stopper units and configured to upwardly bias the stopper unit, wherein
 each of the plurality of stopper units are arranged on an outer side of the base and configured to release the engagement with the piston when external force is applied to a part of the stopper unit.

3. The base anchoring structure of claim 1, wherein an upper end of each of the plurality of pistons protrudes upward from the base.

4. The base anchoring structure of claim 1, further comprising:
 a damper structure arranged at a lower end of each of the plurality of pistons and configured to resiliently expand and contract.

5. The base anchoring structure of claim 1, wherein each stopper unit is configured so that:
 the engagement hole does not engage with the piston when the stopper plate downwardly moves; and
 the engagement hole engages with the side face of the piston when the stopper plate upwardly moves.

* * * * *